US 9,612,146 B2

(12) United States Patent
Speldrich et al.

(10) Patent No.: US 9,612,146 B2
(45) Date of Patent: Apr. 4, 2017

(54) AIRFLOW SENSOR WITH DUST REDUCTION

(71) Applicant: Honeywell International Inc., Morristown, NJ (US)

(72) Inventors: Jamie Speldrich, Freeport, IL (US); Richard C. Sorenson, Columbus, OH (US); Andrew J. Milley, Hilliard, OH (US)

(73) Assignee: Honeywell International, Inc., Morris Plains, NJ (US)

( * ) Notice: Subject to any disclaimer, the term of this patent is extended or adjusted under 35 U.S.C. 154(b) by 393 days.

(21) Appl. No.: 14/175,546

(22) Filed: Feb. 7, 2014

(65) Prior Publication Data

US 2015/0226591 A1    Aug. 13, 2015

(51) Int. Cl.
G01F 15/12    (2006.01)
G01F 15/14    (2006.01)

(52) U.S. Cl.
CPC ............ G01F 15/125 (2013.01); G01F 15/14 (2013.01)

(58) Field of Classification Search
CPC .............................. G01F 15/14; G01F 15/125
See application file for complete search history.

(56) References Cited

U.S. PATENT DOCUMENTS

| | | |
|---|---|---|
| 2,154,489 A | 4/1939 | Buck |
| 4,501,144 A | 2/1985 | Higashi et al. |
| 4,952,904 A | 8/1990 | Johnson et al. |
| 5,050,429 A | 9/1991 | Nishimoto et al. |
| 5,081,866 A | 1/1992 | Ochiai et al. |
| 5,230,245 A | 7/1993 | Kamiunten et al. |
| 5,291,781 A | 3/1994 | Nagata et al. |
| 5,295,389 A | 3/1994 | Nagata et al. |
| 5,321,983 A | 6/1994 | Nagata |
| 5,620,929 A | 4/1997 | Hosoi et al. |

(Continued)

FOREIGN PATENT DOCUMENTS

| | | |
|---|---|---|
| DE | 10129300 A1 | 2/2002 |
| DE | 10211551 A1 | 10/2002 |

(Continued)

OTHER PUBLICATIONS

Search Report for Corresponding EP Application No. EP15152416, dated Jul. 21, 2015.

*Primary Examiner* — Hezron E Williams
*Assistant Examiner* — David Z Huang
(74) *Attorney, Agent, or Firm* — Conley Rose, P.C.; Kristin Jordan Harkins

(57) ABSTRACT

A sensor housing includes an inlet flow port, an outlet flow port, a flow sensing region, and a flow channel extending between the inlet flow port, the flow sensing region and the outlet flow port. The flow channel defines a flow path between the inlet flow port and the flow sensing region that is contorted in three-dimensions. The three-dimensional contorted flow path between the inlet flow port and a flow sensing region may include a particle collection region that is configured to decelerate a fluid and collect particles that are released from the fluid. The deceleration of the fluid flow and/or one or more changes in the direction of fluid flow along the contorted three-dimensional flow path may cause dust and/or other particulate matter to be released from the fluid prior to reaching a sensor in the sensing region.

20 Claims, 12 Drawing Sheets

(56) References Cited

U.S. PATENT DOCUMENTS

| | | |
|---|---|---|
| 5,756,878 A | 5/1998 | Muto et al. |
| 5,765,432 A | 6/1998 | Lock et al. |
| 6,259,350 B1 | 7/2001 | Mueller-Fiedler et al. |
| 6,536,274 B1 | 3/2003 | Zushi et al. |
| 6,550,324 B1 | 4/2003 | Mayer et al. |
| 6,615,655 B1 | 9/2003 | Sakai et al. |
| 6,626,037 B1 | 9/2003 | Wado et al. |
| 6,698,283 B2 | 3/2004 | Wado et al. |
| 6,729,181 B2 | 5/2004 | Mayer et al. |
| 6,779,712 B2 | 8/2004 | Kleinlogel et al. |
| 6,813,944 B2 | 11/2004 | Mayer et al. |
| 6,871,538 B2 | 3/2005 | Fujiwara |
| 6,889,544 B2 | 5/2005 | Tanimoto et al. |
| 6,928,865 B2 | 8/2005 | Ito et al. |
| 6,945,106 B2 | 9/2005 | Lötters et al. |
| 6,981,410 B2 | 1/2006 | Seki et al. |
| 7,117,736 B2 | 10/2006 | Kamiunten et al. |
| 7,185,539 B2 | 3/2007 | Ike et al. |
| 7,188,519 B2 | 3/2007 | Hornung et al. |
| 7,228,733 B2 | 6/2007 | Seki et al. |
| 7,261,350 B2 | 8/2007 | Isetani et al. |
| 7,383,726 B2 | 6/2008 | Ike et al. |
| 7,404,320 B2 | 7/2008 | Sakuma et al. |
| 7,490,511 B2 | 2/2009 | Mayer et al. |
| 7,644,613 B2 | 1/2010 | Mayer et al. |
| 7,698,938 B2 | 4/2010 | Inagaki et al. |
| 7,765,865 B2 | 8/2010 | Ike et al. |
| 7,849,737 B2 | 12/2010 | Ooishi |
| 7,861,585 B2 | 1/2011 | Muraoka et al. |
| 7,886,593 B2 | 2/2011 | Inagaki et al. |
| 7,891,239 B2 | 2/2011 | Inagaki et al. |
| 7,905,140 B2 | 3/2011 | Kanne et al. |
| 8,011,240 B2 | 9/2011 | von Waldkirch et al. |
| 8,087,293 B2 | 1/2012 | Dou et al. |
| 8,104,340 B2 | 1/2012 | Speldrich |
| 8,113,046 B2 | 2/2012 | Speldrich et al. |
| 8,397,586 B2 | 3/2013 | Sorenson et al. |
| 8,485,031 B2 | 7/2013 | Speldrich et al. |
| 8,499,648 B2 | 8/2013 | Sonnenberg et al. |
| 2004/0163461 A1* | 8/2004 | Ito .................. G01F 1/6842 73/204.21 |
| 2009/0078040 A1 | 3/2009 | Ike et al. |
| 2010/0089118 A1 | 4/2010 | Mayer et al. |
| 2010/0175468 A1 | 7/2010 | Anzai et al. |
| 2010/0218614 A1 | 9/2010 | Minamitani et al. |
| 2010/0223991 A1 | 9/2010 | Muraoka et al. |
| 2011/0226052 A1* | 9/2011 | Speldrich .............. B01D 17/10 73/204.22 |
| 2012/0118407 A1* | 5/2012 | Sonnenberg ............ G01F 1/68 137/551 |

FOREIGN PATENT DOCUMENTS

| | | |
|---|---|---|
| EP | 1065475 A2 | 1/2001 |
| EP | 1084369 B1 | 1/2003 |
| EP | 1754959 | 2/2007 |
| EP | 2348292 A1 | 7/2011 |
| WO | 2004020958 A1 | 3/2004 |
| WO | 2012169202 | 12/2012 |
| WO | 2013183283 | 12/2013 |

* cited by examiner

AIRFLOW SENSOR WITH DUST REDUCTION

TECHNICAL FIELD

The present disclosure relates generally to sensors, and more particularly, to methods and devices for reducing moisture, dust, particulate matter and/or other contaminants from affecting the performance of a sensor.

BACKGROUND

Sensors, such as humidity, temperature, pressure, and flow sensors, are often used to sense one or more properties of a fluid (e.g. gas or liquid) in a fluid channel. Such sensors are used in a wide variety of applications including, for example, medical applications, flight control applications, industrial process applications, combustion control applications, weather monitoring applications, as well as many other applications. In some instances, dust, particulate matter, and/or other contaminants can enter the sensor during use and build up over time. Such contaminants can impact the accuracy, repeatability, functionality and/or other aspects of the sensor. There is a need for new and improved systems and methods for reducing dust, particulate matter, and/or other contaminants from affecting the performance of a sensor.

SUMMARY

The present disclosure relates generally to sensors, and more particularly, to methods and devices for reducing dust, particulate matter, and/or other contaminants from affecting the performance of a sensor. In one example, a sensor housing includes: an inlet flow port; an outlet flow port; and a flow channel extending between the inlet flow port and the outlet flow port. The flow channel includes: a first flow channel region for accepting a fluid entering the inlet flow port of the housing along a Y axis of an X-Y-Z coordinate system, and for turning the fluid to flow along an X axis of the X-Y-Z coordinate system; a second flow channel region downstream of the first flow channel region, the second flow channel region is configured to accept the fluid from the first flow channel region along the X axis of the X-Y-Z coordinate system, the second flow channel region having a greater cross-sectional area than the first flow channel region; a third flow channel region downstream of the second flow channel region, wherein the third flow channel region is configured to accept the fluid from the second flow channel region along a Z axis of the X-Y-Z coordinate system; and a fourth flow channel region downstream of the third flow channel region for directing the fluid from the third flow channel region to a sensing region. In some instances, a sensor may be positioned in the sensing region. The sensor may be, for example, a humidity sensor, a temperature sensor, a pressure sensor, a flow sensor, and/or any other suitable sensor.

In another example, a flow sensor housing includes an inlet flow port, an outlet flow port, a flow sensing region, and a flow channel extending between the inlet flow port, the flow sensing region and the outlet flow port. The flow channel defines a flow path between the inlet flow port and the flow sensing region that is contorted in three-dimensions. Additionally, the flow path between the inlet flow port and a flow sensing region includes a particle collection region that is configured to decelerate a fluid following through the flow channel and collect particles that are released from the fluid.

In yet another example, a method of sensing flow rate of a fluid that has one or more particles in the fluid includes: directing the fluid between an inlet flow port and a flow sensing region along a flow path that is contorted in three-dimensions; decelerating the fluid and collecting particles that are released in a particle collection region; directing the fluid from the particle collection region to the flow sensing region; and sensing the flow rate of the fluid in the flow sensing region.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
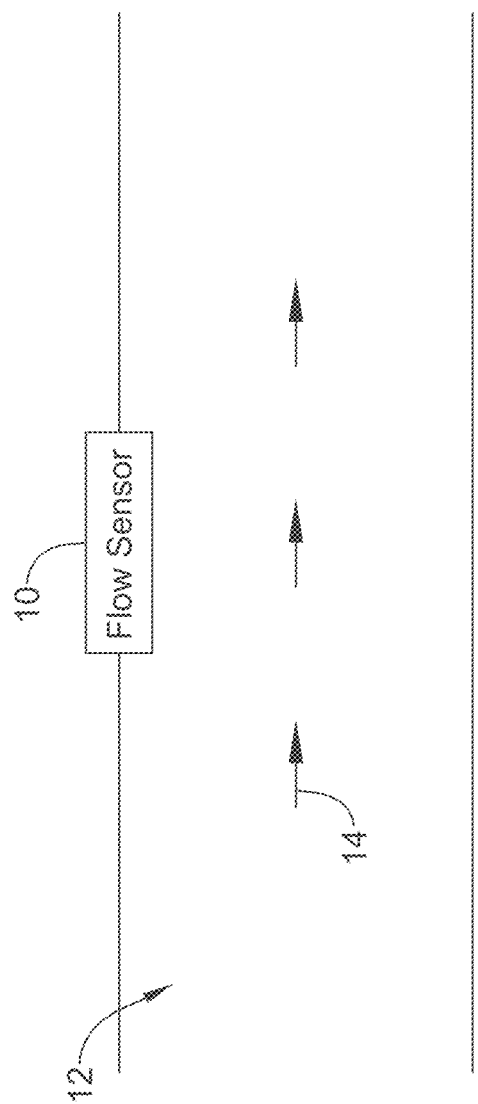
FIG. 1 is a schematic diagram of an illustrative flow sensor for measuring a fluid flow rate of a fluid passing through a fluid channel.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several illustrative embodiments and are not meant to be limiting in any way.

For simplicity, the examples described below are flow sensors. However, it is contemplated that the sensor may be may any suitable type of sensor such as a humidity sensor, a temperature sensor, a pressure sensor, a flow sensor, and/or any other suitable sensor, as desired.

FIG. 1 is a schematic diagram of an illustrative flow sensor 10 for measuring a fluid flow rate of a fluid flow 14 passing through a fluid channel 12. The term "fluid" as used herein can refer to a gas or a liquid, depending on the application. In the illustrative embodiment, the flow sensor 10 may be exposed to and/or disposed in the fluid channel 12 to measure one or more properties of the fluid flow 14. For example, the flow sensor 10 may measure the mass flow and/or velocity of the fluid flow 14 using one or more thermal sensors (e.g. see FIG. 2), pressure sensors, acoustical sensors, optical sensors, pitot tubes, and/or any other suitable sensor or sensor combination, as desired. In some cases, the flow sensor 10 may be a microbridge or a Microbrick™ sensor assembly available from the assignee of the present application, but this is not required. Some illustrative methods and sensor configurations that are considered suitable for measuring the mass flow and/or velocity of the fluid flow 14 are disclosed in, for example, U.S. Pat. Nos. 4,478,076; 4,478,077; 4,501,144; 4,581,928; 4,651,564; 4,683,159; 5,050,429; 6,169,965; 6,223,593; 6,234,016; 6,502,459; 7,278,309; 7,513,149; and 7,647,842. It is contemplated that flow sensor 10 may include any of these flow sensor configurations and methods, as desired. It will be generally recognized, however, that flow sensor 10 may be any suitable flow sensor, as desired.

In the illustrative example, the fluid channel 12 may experience a range of flow rates of fluid flow 14. For example, the fluid channel 12 may include a high-volume fluid flow, a mid-volume fluid flow, or a low-volume fluid flow. Example fluid flow applications can include, but are not limited to, respirometers, flow meters, velocimeters, flight control, industrial process stream, combustion control, weather monitoring, as well as any other suitable fluid flow applications, as desired. In some cases, the flow sensor 10 may be configured to sense a measure related to a fluid flow rate of the fluid flowing through the fluid channel.

Figure 2:
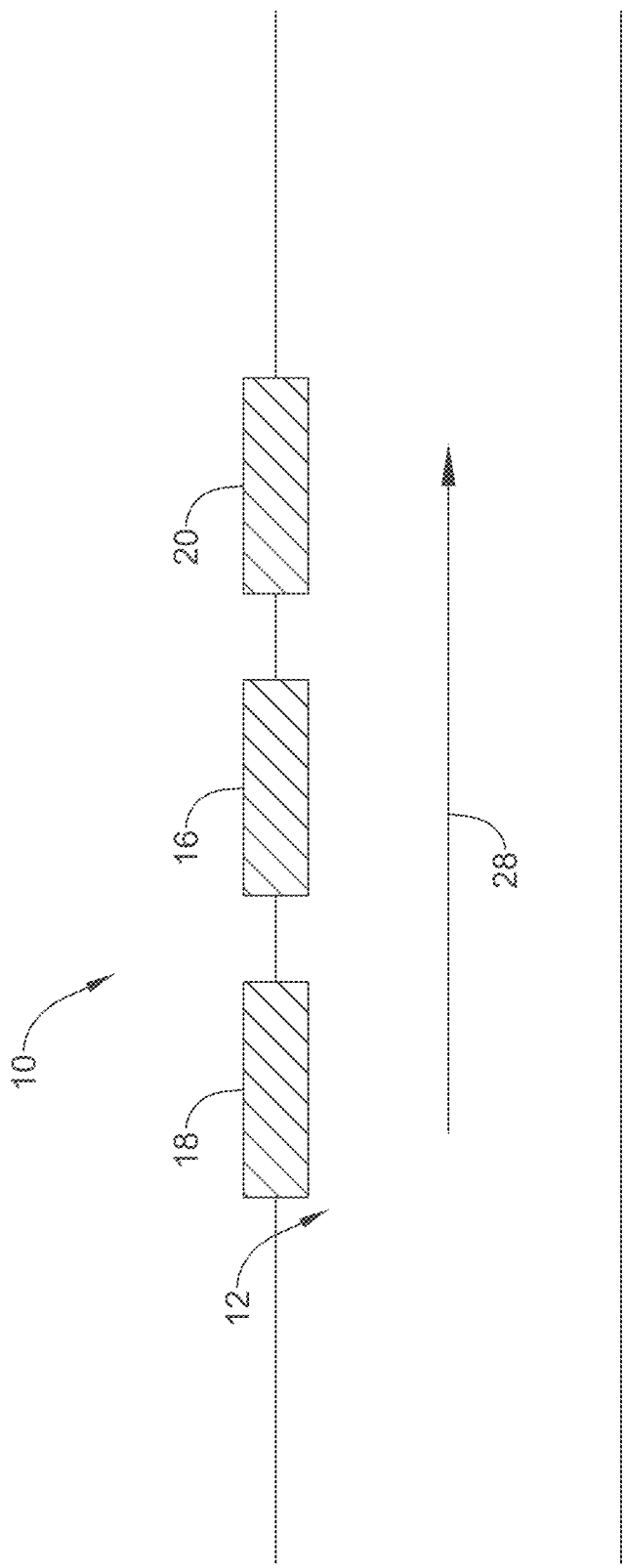
FIG. 2 is a schematic diagram of an illustrative flow sensor assembly useful for measuring the flow rate of a fluid passing through a fluid channel.

FIG. 2 is a schematic diagram of an illustrative thermal flow sensor assembly 10 for measuring the flow rate of a fluid flow 14 passing through a fluid channel 12. As will be described in greater detail herein, the fluid channel 12 may define a three-dimensional fluid flow path that is configured to reducing dust, particulate matter, and/or other contaminants from affecting the performance of the flow sensor 10. In some cases, and while not expressly shown in FIG. 2, the flow channel 12 may define a flow path between an inlet flow port and flow sensor 10 that is contorted in three-dimensions. In some instances, the three-dimensional fluid path may be constructed to direct fluid along each of an X-axis, a Y-axis and a Z-axis of an X-Y-Z coordinate system, and may cause fluid flow to accelerate and/or decelerate as it flows through the fluid channel 12 changing direction along the various axes of the X-Y-Z coordinate system. The acceleration and/or deceleration of the fluid and/or at least one change in direction as the fluid flows along the three-dimensional flow path may cause dust or other particulate matter in the fluid to be released and collected prior to the fluid reaching the flow sensor 10. In some cases, the fluid channel 12 may also be constructed such that it includes one or more particle matter collection regions for collecting dust and/or other particulate matter that is released from the fluid. The reduction of dust, and/or other contaminants at the flow sensor 10 may provide a more consistent, reliable, accurate, repeatable, and/or stable output of the flow sensor for a longer period of time.

As illustrated in FIG. 2, the flow sensor assembly 10 may include one or more heater elements, such as heater element 16, and one or more sensor elements 18 and 20, for sensing a flow rate of a fluid in the fluid channel 12. Additionally, the flow sensor assembly 10 may include a heater element 16, a first sensor element 18 positioned upstream of the heater element 16, and a second sensor element 20 positioned downstream of the heater element 16. While the first sensor element 18 is shown as upstream of the heater element 16, and the second sensor element 20 is shown as downstream of the heater element 16, this is not meant to be limiting. It is contemplated that, in some cases, the fluid channel 12 may be a bi-directional fluid channel such that, in some cases, the first sensor element 18 is downstream of the heater element 16 and the second sensor element 20 is upstream of the heater element 16. In some instances, only one sensor element may be provided, and in other instances, three or more sensor elements may be provided. In some cases, both sensor elements 18 and 20 may be positioned upstream (or downstream) of the heater element 16.

In some cases, the first sensor element 18 and the second sensor element 20 may be thermally sensitive resistors that have a relatively large positive or negative temperature coefficient, such that the resistance varies with temperature. In some cases, the first and second sensing elements 18 and 20 may be thermistors. In some instances, the first sensor element 18, the second sensor element 20, and any additional sensor elements may be arranged in a Wheatstone bridge configuration, but this is not required in all embodiments.

In the example shown, when no fluid flow is present in the fluid channel 12 and the heater element 16 is heated to a temperature above the ambient temperature of the fluid in the fluid flow 28, a temperature distribution is created and transmitted in a generally symmetrical distribution about the heater element 16 to upstream sensor element 18 and downstream sensor element 20. In this example, upstream sensor element 18 and downstream sensor element 20 may sense the same or similar temperature (e.g. within 25 percent, 10 percent, 5 percent, 1 percent, 0.001 percent, etc.). In some cases, this may produce the same or similar output voltage in the first sensor element 18 and the second sensor element 20.

When a fluid flow 28 is present in the fluid channel 12 and the heater element 16 is heated to a temperature above the ambient temperature of the fluid in the fluid flow 28, the symmetrical temperature distribution may be disturbed and the amount of disturbance may be related to the flow rate of the fluid flow 28 in the fluid channel 12. The flow rate of the fluid flow 28 may cause the upstream sensor element 18 to sense a relatively cooler temperature than the downstream sensor element 20. In other words, the flow rate of the fluid flow 28 may cause a temperature differential between the upstream sensor element 18 and the downstream sensor element 20 that is related to the flow rate of the fluid flow 28 in the fluid channel 12. The temperature differential between the upstream sensor element 18 and the downstream sensor element 20 may result in an output voltage differential between the upstream sensor element 18 and the downstream sensor element 20.

In another illustrative embodiment, the mass flow and/or velocity of the fluid flow 28 may be determined by providing a transient elevated temperature condition in the heater element 16, which in turn, causes a transient elevated temperature condition (e.g. heat pulse) in the fluid flow 28. When there is a non-zero flow rate in the fluid flow 28, the upstream sensor element 18 may receive a transient response later than the downstream sensor element 20. The flow rate of the fluid flow 28 can then be computed using the time lag between the upstream sensor element 18 and downstream sensor element 20, or between the time the heater is energized and when the corresponding elevated temperature condition (e.g. heat pulse) is sensed by one of the sensors, such as the downstream sensor element 20. These are just some example flow sensors that may be used.

Figure 3A:
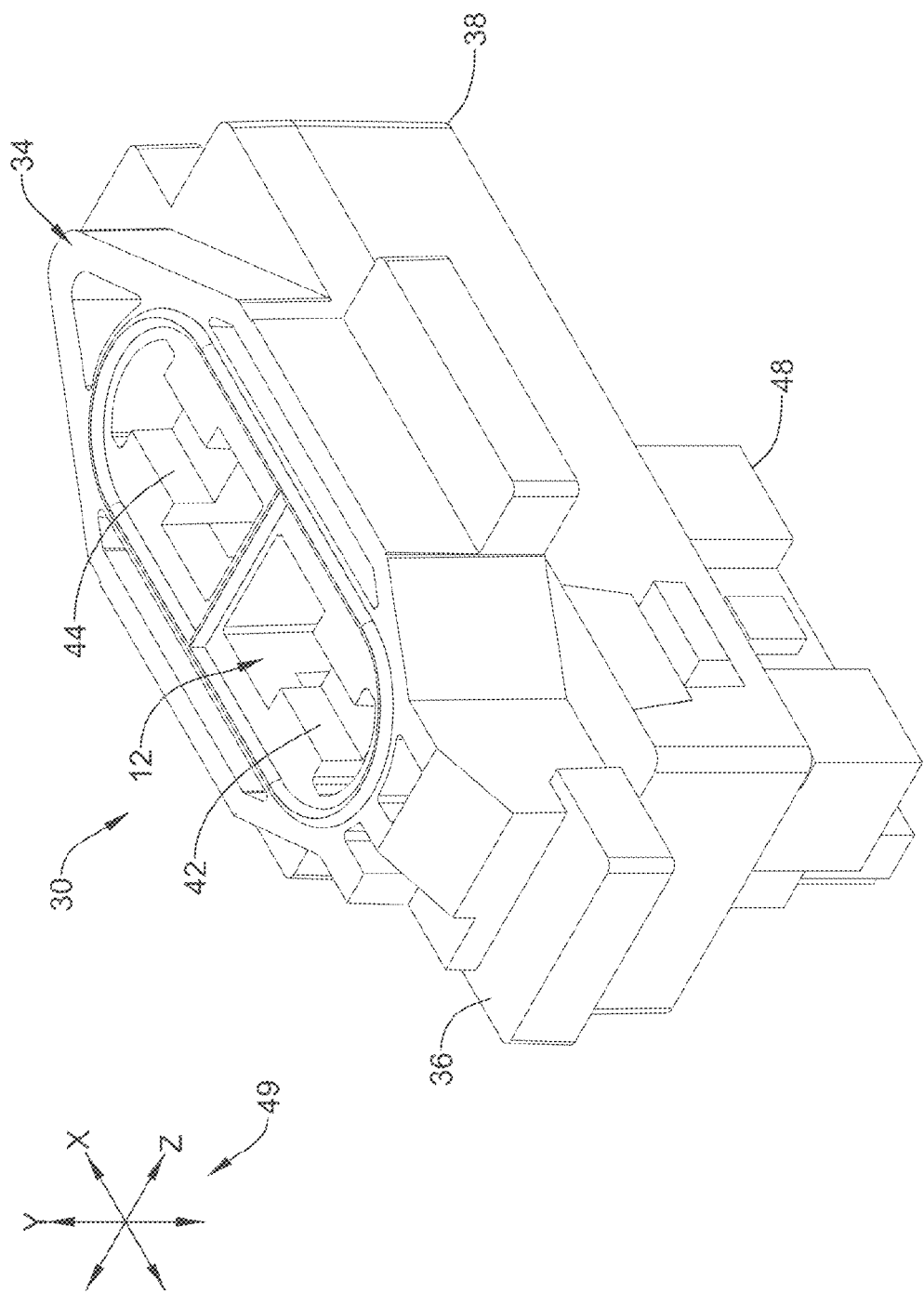
FIG. 3A is a perspective view of an illustrative sensor housing and connector.
Figure 3B:
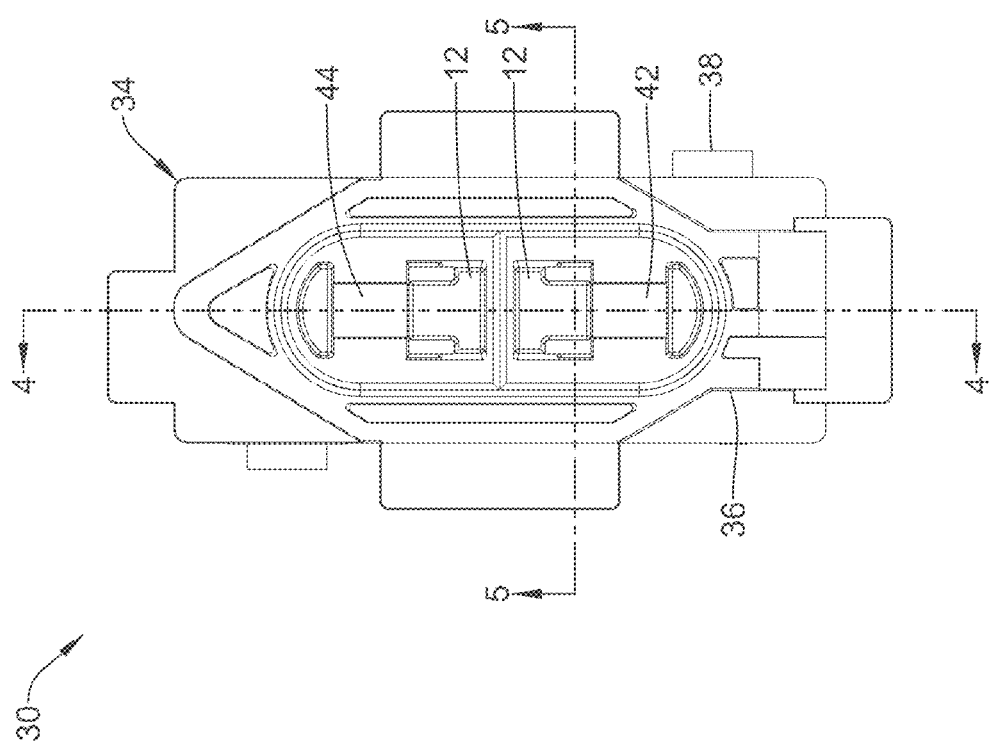
FIG. 3B is a top plan view of the flow sensor housing shown in FIG. 3A.

FIG. 3A is a perspective view of an illustrative sensor assembly 30 that includes a housing 34 having a fluid channel 12 formed therein. FIG. 3B is a top plan view of the flow sensor assembly 30 shown in FIG. 3A. As shown in FIGS. 3A and 3B, the housing 34 includes a top portion 36 coupled to or, in the alternative, integrally formed with, a bottom portion 38. Together, the top portion 36 and the bottom portion 38 of the housing 34 may protect the flow sensing element (not shown) and any signal conditioning circuitry and/or other electrical connectors that may be provide in the housing 34.

As shown in FIGS. 3A and 3B, the top portion 36 of the housing 34 may include a first flow port 42 and a second flow port 44. The fluid channel 12 defines a flow path extending between the first flow port 42 and the second flow port 44. The sensing element (not shown) is exposed to the fluid in the fluid channel 12. In some cases, flow port 42 may be an inlet flow port 42, and flow port 44 may be an outlet flow port 44, but this is not required. In some cases, it is contemplated that the flow sensor assembly 30 may be a bi-directional flow sensor assembly and, in this case, either flow port 42 or flow port 44 may serve as the inlet flow port or the outlet flow port, depending on the current direction of the fluid flow through the flow channel.

As shown in FIG. 3A, the flow sensor assembly 30 may include a mating connector 48 such as a ribbon or a cable connector for electrically connecting the flow sensor assembly 30 to a controller, circuit board, or any other suitable device or assembly. The mating connector 48 may include one or more electrical leads or traces that may be in electrical communication with the flow sensor and/or other electrical circuitry located within the housing 34.

In some cases, the top portion 36 and the bottom portion 38 of the housing 34 may be formed from, for example, plastic. For example, it is contemplated that the housing 34 may be formed by injection molding a plastic. In some cases, the housing 34, including the top portion 36 and the bottom portion 38 can be molded as a single piece from a plastic or other suitable material. While these are provided as examples, it is contemplated that any suitable material and/or manufacturing method may be used to form housing 34, as desired. For example, in some cases, the housing 34, including the top portion 36 and the bottom portion 38, may be formed as two or more separate pieces, which are subsequently secured together as desired. These are just some examples.

Figure 4:
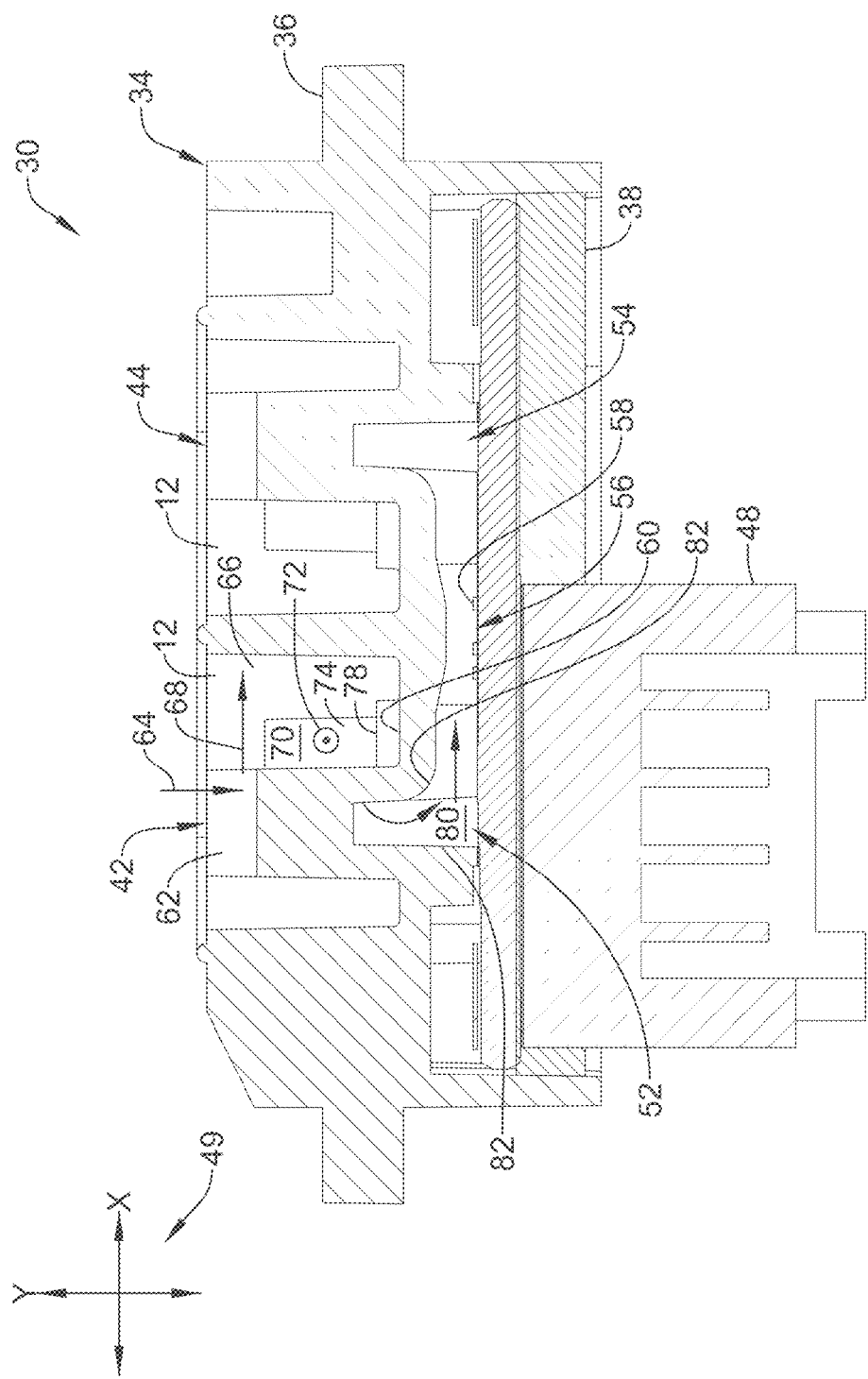
FIG. 4 is a schematic, cross-sectional view taken along an X-Y plane of the flow sensor assembly of FIGS. 3A and 3B along line 4-4.
Figure 5:
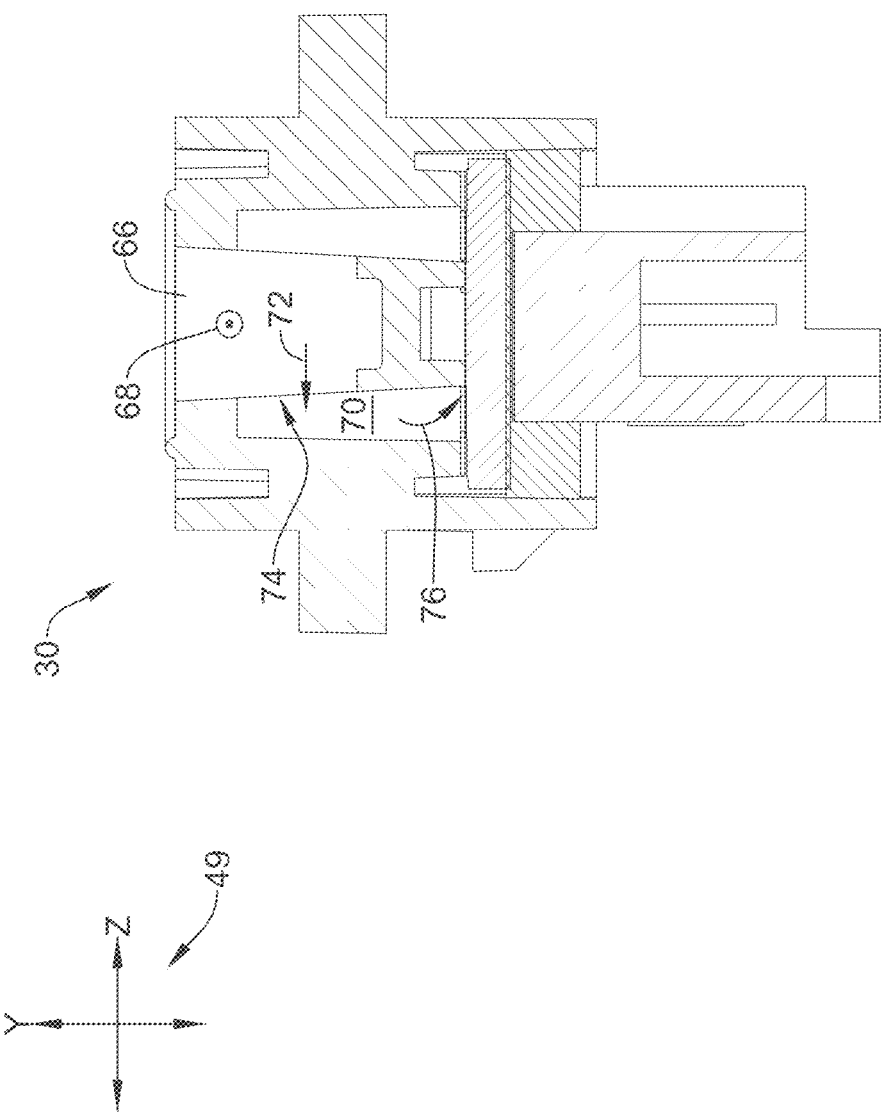
FIG. 5 is a schematic, cross-sectional view taken along a Y-Z plane of the flow sensor assembly of FIGS. 3A and 3B alone line 5-5.

FIG. 4 is a schematic, cross-sectional view taken along the X-Y plane of the flow sensor assembly 30 shown in FIGS. 3A and 3B along line 4-4. FIG. 5 is a schematic, cross-sectional view taken along a Y-Z plane of the flow sensor assembly 30 shown in FIG. 3A along line 5-5. As can be seen in FIG. 4, the fluid channel 12 is defined between the inlet flow port 42 and the outlet flow port 44 of the flow sensor assembly 30. The fluid channel 12 includes a flow sensing region 56 having at least one flow sensor, such as the flow sensor 10 described with reference to FIGS. 1-2. While a flow sensor is referenced here, it is contemplated that the sensor may be any suitable sensor, such as a humidity sensor, a temperature sensor, a pressure sensor, a flow sensor, and/or any other suitable sensor as desired.

In some cases, the fluid channel 12 defines a first three-dimensional fluid flow path 52 between the inlet flow port 42 and the flow sensing region 56 of the fluid channel 12. In some cases, the fluid channel 12 further defines an additional flow path 54 between the flow sensing region 56 and the outlet flow port 44. The first fluid flow path 52 and the second fluid flow path 54 may be in fluid communication with one another, as best seen in FIG. 4, such that fluid enters the flow sensor assembly 30 through the inlet port 42, follows the first and second flow paths defined by the fluid channel 12 to the flow sensing region 56 where at least one sensor element 58 may sense a measure related to a fluid flow rate, and exits the flow sensor assembly 30 via the outlet flow 44.

While the shape and configuration of the flow path defined by the fluid channel 12 will be described as it relates to the first flow path 52 located on the upstream side of the flow sensing region 56, it will be generally understood that because the fluid channel 12 may be a bi-directional fluid channel 12 allowing for fluid flow in either direction, the second flow path 54 located on the downstream side of the flow sensing region 56 may have a similar or even the same shape and or configuration as the first flow path 52. For example, the first flow path 52 and the second flow path 54 may be each constructed such that they have a common shape and configuration such that fluid may be introduced via port 42 or port 44, depending upon the application. More generally, the shape and dimensions of the first fluid flow path 52 and the second fluid flow path 54 may be substantially the same (e.g. within manufacturing tolerances) or different, depending on the application.

Turning now to the first flow path 52, the first fluid flow path 52 may be constructed such that it is a three-dimensional fluid flow path and is configured to direct fluid in two or more directions along an X, Y, and/or Z-axis of an X-Y-Z coordinate system 49 (see FIG. 3A) toward the flow sensing region 56 of the fluid channel 12 including the at least one flow sensing element 58, as described herein. In some cases, the three-dimensional fluid flow path 52 may be contorted along each of the X, Y and/or Z axes of an X-Y-Z coordinate system 49 such that at least a portion of the flow path 52 has a three-dimensional, corkscrew, shape. In other cases, the three-dimensional fluid flow path 52 may be contorted along each of the X, Y and/or Z axes of an X-Y-Z coordinate system 49 such that at least a portion of the flow path 52 has a three-dimensional, spiral, shape. In still other cases, the three-dimensional fluid flow path 52 may be contorted along each of the X, Y and/or Z axes of an X-Y-Z coordinate system such that at least a portion of the flow path 52 has a three-dimensional, twisted, shape. Each of the three-dimensional (e.g. corkscrew, spiral and twisted) shapes may be constructed such that they direct fluid in a generally downward direction from the inlet port 42 toward the flow sensing region 56 of the fluid channel 12. In addition, the three-dimensional fluid flow path 52 may be constructed such that it causes fluid flow to accelerate and/or decelerate as the fluid moves through the fluid flow path 52 defined by the fluid channel 12. The acceleration and/or deceleration of the fluid flow and/or one or more changes in the direction of fluid flow along any one of the X, Y, and/or Z-axis of the X-Y-Z coordinate system may cause dust or particulate matter to be released from the fluid prior to the fluid reaching the flow sensing region 56 of the fluid channel 12. In some instances, the flow path 52 defined by the fluid channel 12 may include one or more particulate matter collection regions 60 for collecting dust or particulate matter that is released from the fluid as the fluid follows the flow path 52. The reduction of dust and/or other contaminants at the flow sensing element 58 may provide a more consistent, reliable, accurate, repeatable, and/or stable output over time.

In some cases, the fluid channel 12 may include various flow channel regions and openings (e.g. doors) that together define, at least in part, the three-dimensional fluid flow path 52 and, in some cases may cause fluid flow to accelerate and/or decelerate as it flows along the fluid flow path 52. For example, as shown in FIG. 4, the fluid flow path 52 defined by the fluid channel 12 may include a first flow channel region 62 for accepting a fluid entering the flow sensor assembly 30 via the inlet flow port 42. The fluid may enter the first flow channel region 62 via the inlet flow port 42 along a Y-axis of an X-Y-Z coordinate system 49, as indicated by arrow 64 shown in FIG. 4. The fluid flow path 52 may include a second flow channel region 66 located downstream of the first flow channel region 62. The second flow channel region 66 may be configured to accept the fluid from the first flow channel region 62 along an X-axis of the X-Y-Z coordinate system 49, as indicated by arrow 68 shown in FIG. 4. In some cases, the second flow channel region 66 may have a greater volume and/or a greater cross-sectional area than the first flow channel region 62, which may cause the flow rate or the average fluid velocity of the fluid to decrease upon entering the second flow channel region 66. Deceleration of the fluid flow rate or average fluid velocity coupled with the change in direction of fluid flow may cause dust and/or other particulate matter present in the fluid stream to be released. In some cases, the second flow channel region 66 may include a particulate matter collection region 60 for collecting dust and/or other particulate matter that may be released from the fluid as the fluid passes from the first flow channel region 62 to the second flow channel region 66. The particulate matter collection region 60 may be located in a bottom portion of the second flow channel region as shown. In some cases, a lower surface 78 of a door 74 may be positioned above and spaced apart from the particulate matter collection region 60 of the second flow channel region 66, which may, in part, help to define the particulate matter collection region 60.

Fluid may continue to flow downstream toward the flow sensing region 56 from the second flow channel region 66 into a third flow channel region 70. In some cases, the third flow channel region 70 may be configured to accept the fluid from the second flow channel region 66 at least partially along a Z-axis 72 (into the paper) of an X-Y-Z coordinate system 49. The fluid may pass from the second flow channel region 66 into the third flow channel region 70 via the door 74 or other aperture in the sidewall of the second flow channel region 66. FIG. 5 shows the relationship between the second flow channel region 66, the door 74 and the third flow channel region 70. In some cases, the aperture or door 74 may have a cross-sectional area that is less than the cross-section area of the second flow channel region 66, which may cause the fluid flow rate or average fluid velocity to accelerate as the fluid passes through the door 74 from the second flow channel region 66 to the third flow channel region 70. As shown in FIG. 5, the third flow channel region 70 may include an additional particulate matter collection region 76 that may collect additional particulate matter that might be released from the fluid upon acceleration of the fluid through the door 74 and into the third flow channel region 70.

In some cases, fluid may continue to flow downstream toward the flow sensing region 56 from the third flow channel region 70 into a fourth flow channel region 80. In some cases, the fluid flow may undergo at least one additional directional change, and may follow a contoured or curved three-dimensional flow path toward the flow sensing region 56. The contoured or curved three-dimensional flow path may be defined by one or more inner walls 82 of the fourth flow channel region 80. In some cases, at least one of the inner walls 82 may be curved to facilitate reduced turbulence in the fluid as it follows the three-dimensional fluid flow path 52. In some cases, the fourth flow channel region 80 may include a fin or other similar feature to help laminarize fluid flow in the flow sensing region 56.

Figure 6A:
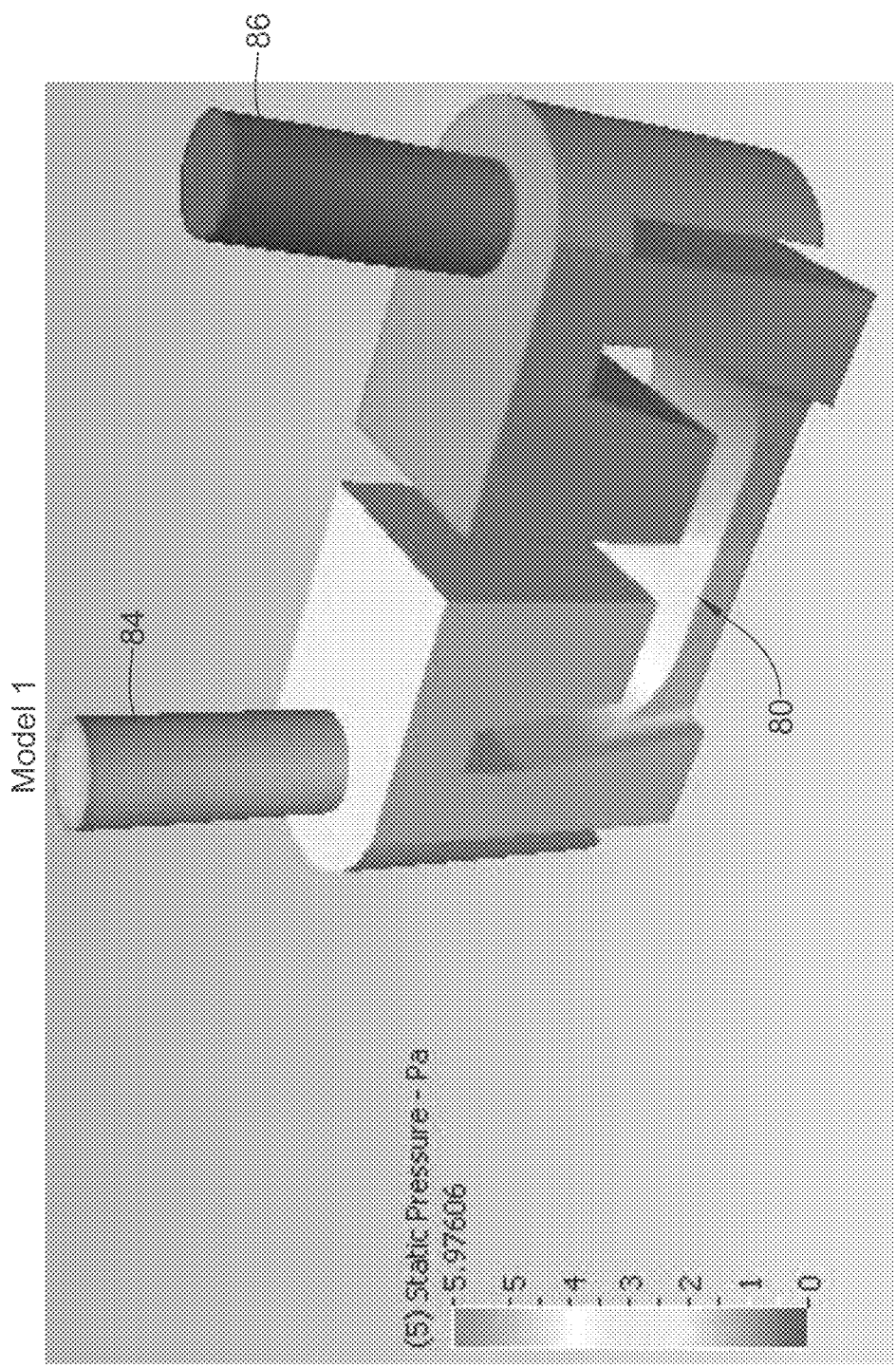
FIGS. 6A-6C show three different flow path models.
Figure 6B:
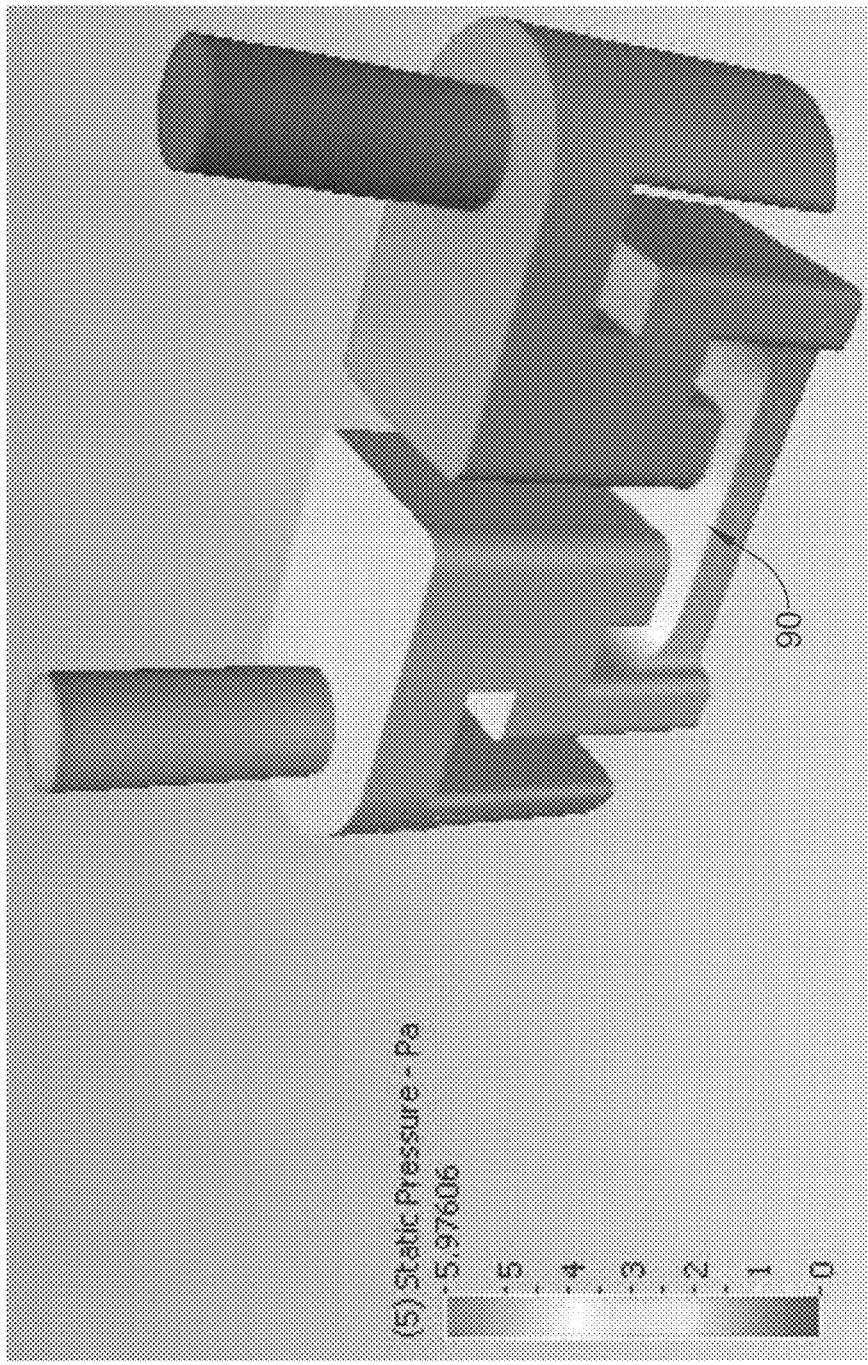
Figure 6C:
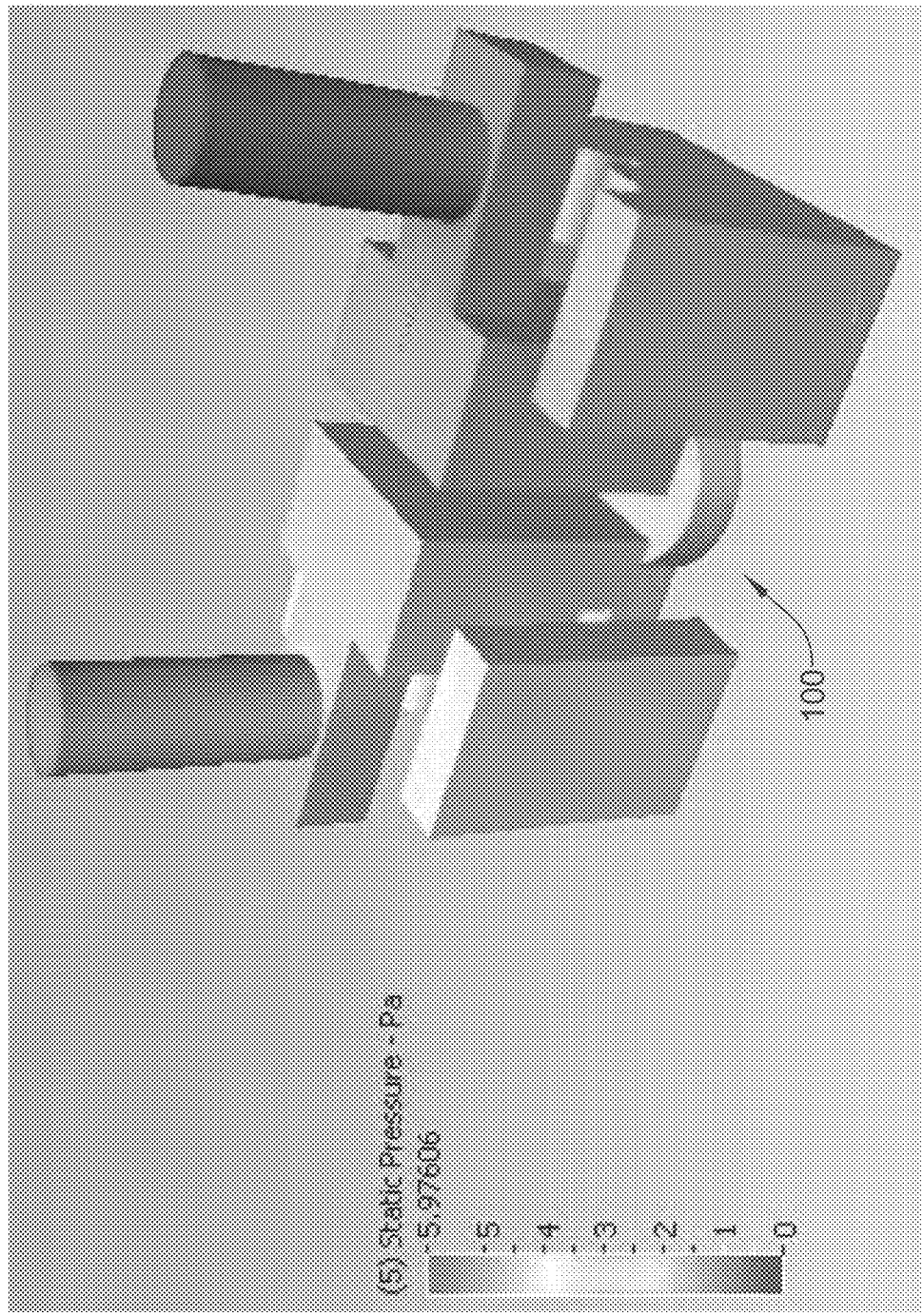
Figure 7A:
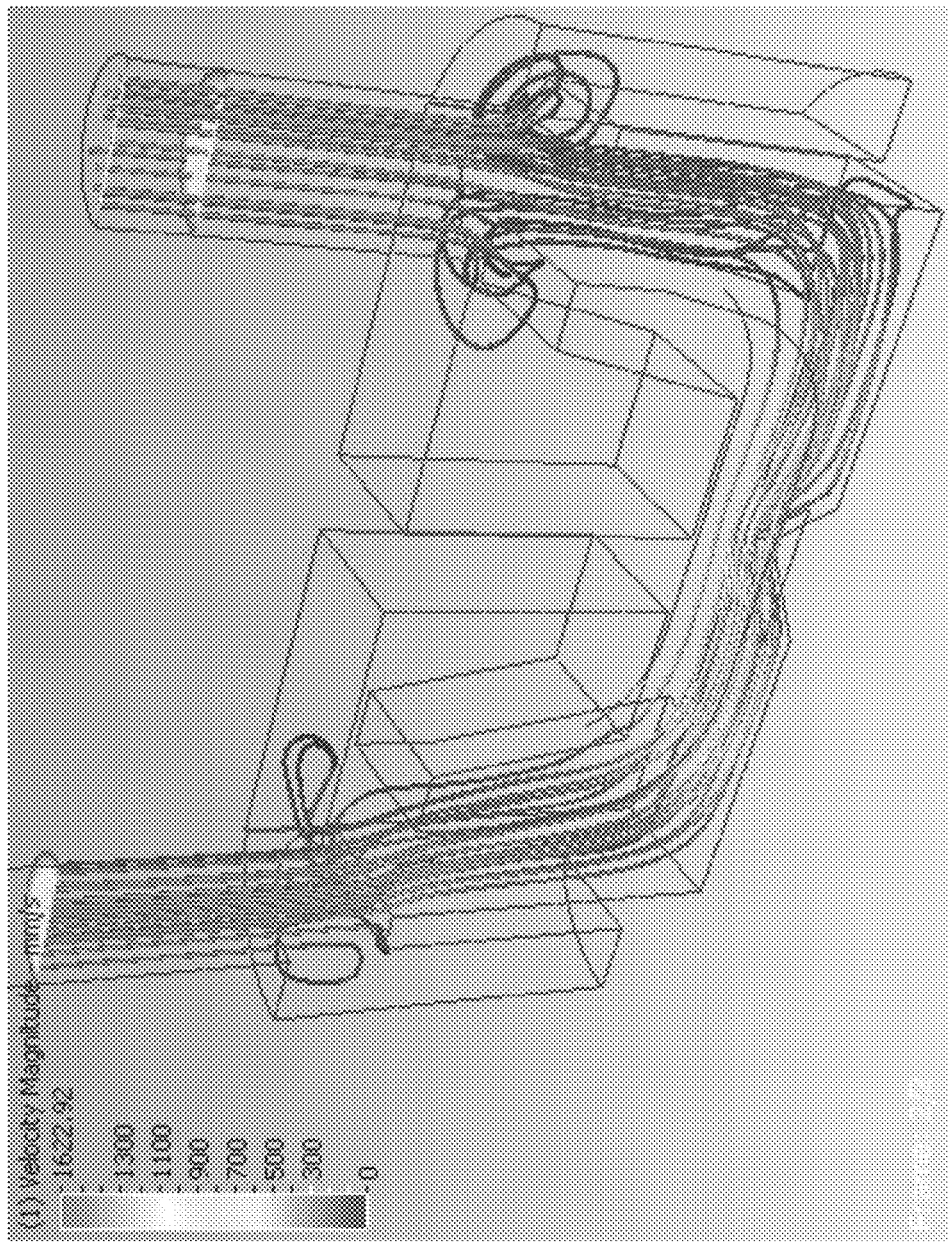
FIGS. 7A-7C show simulated fluid flow through the three different flow path models shown in FIGS. 6A-6C, respectively.
Figure 7B:
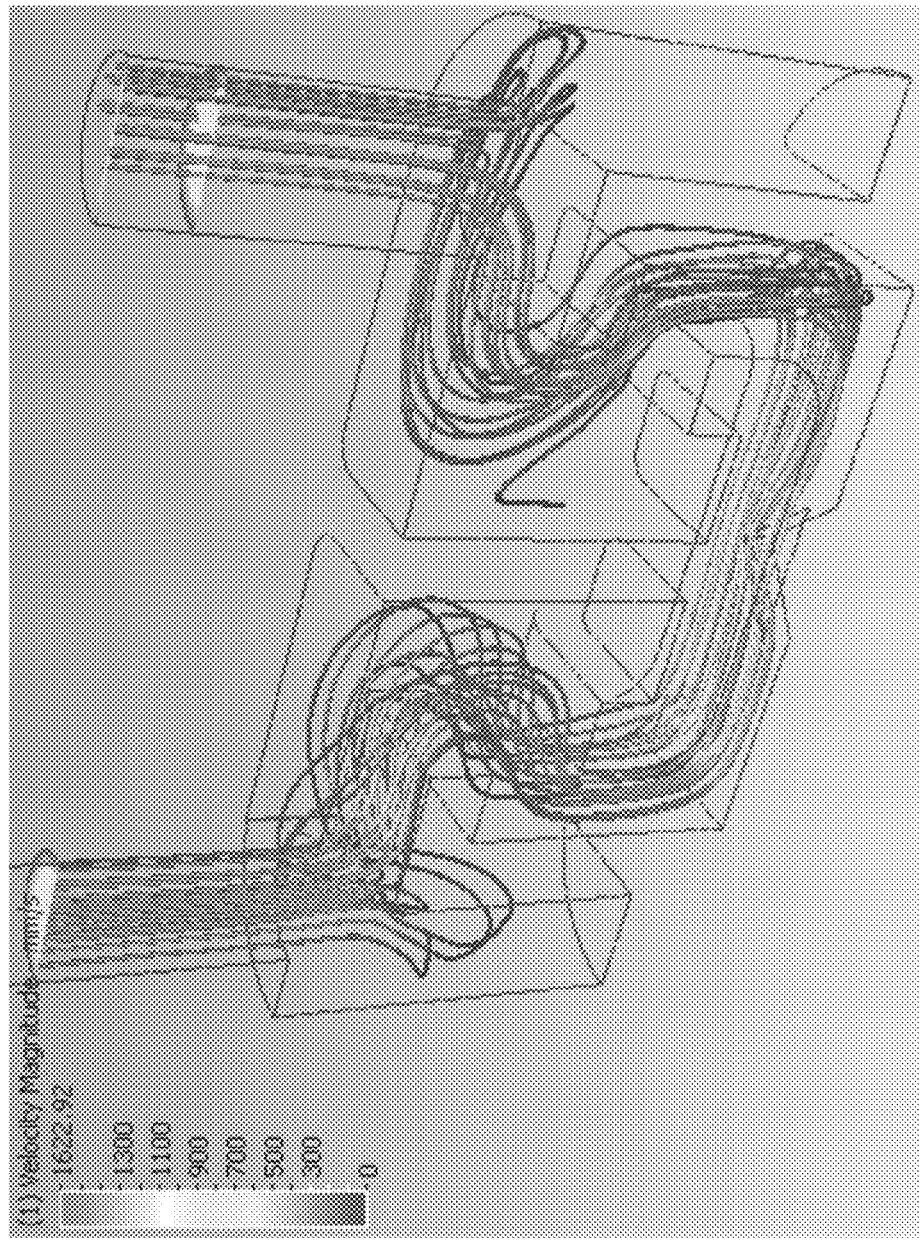
Figure 7C:
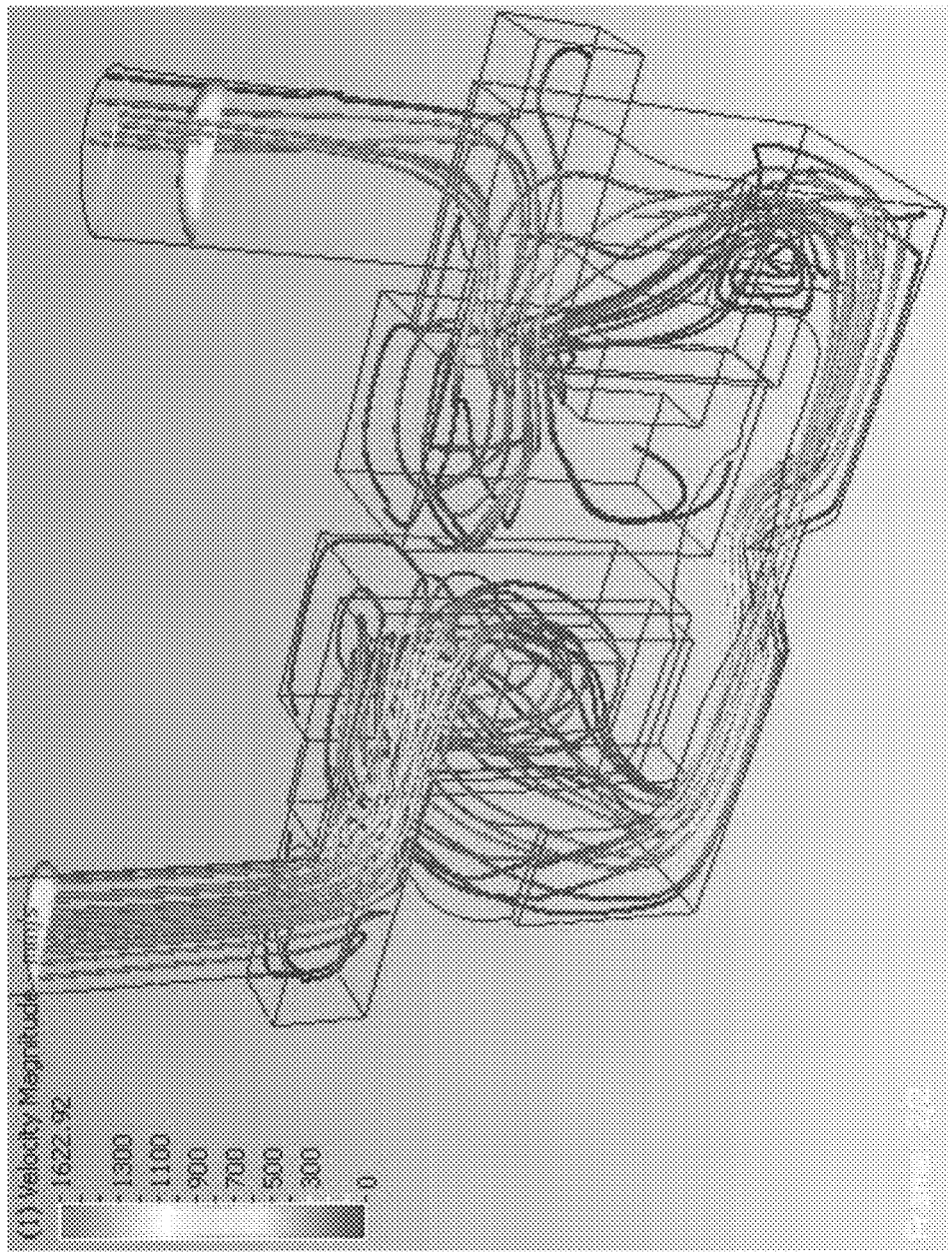

Computation fluid dynamics computer simulations using standard computation fluid dynamics simulation software were conducted to evaluate the dust particle reduction capabilities of three different flow path models, each model having a different structural configuration. FIGS. 6A-6C show the three different flow path configurations evaluated during these simulations. The first model, Model 1 shown in FIG. 6A, has a relatively straight flow path 80 defined between the inlet port 84 and the outlet port 86. The second model, Model 2 shown in FIG. 6B, has a flow path 90 representative of the flow path shown and described in U.S. Pat. No. 7,698,938, and has one or more bends in a two-dimensional flow path (along an X-Y plane). The third model, Model 3 shown in FIG. 6C, has a flow path 100 that is representative of the three-dimensional flow path of the sensor housing shown in FIGS. 4 and 5 of the present application. FIGS. 7A-7C show the simulated fluid flow through each of the different flow path models of FIGS. 6A-6C, respectively.

The dust reduction capabilities of the three different flow path configurations, shown in FIGS. 6A-6C, were evaluated using the dust property variables provided below in Table 1.

TABLE 1

Dust Property Variables Definition

| | | |
|---|---|---|
| Particle Mass | 1.5 g/cm³ | Density similar to soil. |
| Particle Diameter | 0.01 mm (10 micron) | |
| Coefficient of Restitution | 0.05 | 1.0 = bounces off wall; 0.01 sticks to wall. |

For each model, twenty-two dust particles were introduced in a radial pattern near the inlet port of each of the three different models. A flow rate of approximately 50 sccm was applied to the inlet surface. The percent reduction in dust particles was determined by comparing the amount of dust particles introduced into the inlet port to the number of dust particles detected in the flow sensor region of each of the models. The simulation results are provided below in Table 2 below.

TABLE 2

Dust Particle Reduction Simulation Results

| Simulation Model | Initial Qty Dust Particles | Particles at Upstream Channel with Gravity (Qty) | | | | | | Particle Reduction | | | Pressure Drop 100 sccm (Pa)[1] |
|---|---|---|---|---|---|---|---|---|---|---|---|
| | | X | | Y | | Z | | MIN | MAX | AVERAGE | |
| | | 1 | −1 | 1 | −1 | 1 | −1 | | | | |
| Model 1 | 22 | 21 | 19 | 20 | 21 | 17 | 18 | 5% | 23% | 12% | 6.21 |
| Model 2 | 22 | 16 | 12 | 17 | 10 | 14 | 15 | 23% | 55% | 36% | 5.98 |
| Model 3 | 22 | 16 | 9 | 14 | 10 | 11 | 11 | 27% | 59% | 46% | 5.91 |

As can be seen from the simulation results provided in Table 2, Model 3, including the three-dimensional flow path, provides the greatest dust reduction, with an average dust reduction of approximately 46%.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A flow sensor housing, comprising:
   an inlet flow port;
   an outlet flow port;
   a flow sensing region;
   a flow channel extending between the inlet flow port, the flow sensing region and the outlet flow port, the flow channel defining a flow path between the inlet flow port and the flow sensing region that is contorted in three-dimensions, wherein the flow path includes a first flow channel region configured to receive a fluid from the inlet flow port along a first axis; and
   wherein the flow path between the inlet flow port and a flow sensing region includes a particle collection region that is configured to decelerate the fluid and collect particles that are released from the fluid, wherein the particle collection region comprises at least one of a greater volume or a greater cross-sectional area than the remainder of the flow path, wherein the particle collection region is configured to receive the fluid from the first flow channel region through a first opening aligned perpendicular to a second axis, and wherein the flow path is configured to include a second flow channel region between the particle collection region and the flow sensing region that is configured to receive the fluid from the particle collection region through a second opening aligned perpendicular to a third axis, wherein the first axis and the second axis are parallel to an X-axis and a Y-axis of an X-Y-Z coordinate system, and wherein the third axis has a component that is parallel to the Z-axis of the X-Y-Z coordinate system.

2. The flow sensor housing of claim 1 further comprising a flow sensor in the flow sensing region for sensing a measure related to a fluid flow rate of the fluid flowing in the flow sensing region.

3. The flow sensor housing of claim 1, wherein at least part of the flow path between the inlet flow port and a flow sensing region is contorted into a three-dimensional spiral shape.

4. The flow sensor housing of claim 1, wherein at least part of the flow path between the inlet flow port and a flow sensing region is contorted into a three-dimensional corkscrew shape.

5. The flow sensor housing of claim 1, wherein at least part of the flow path between the inlet flow port and a flow sensing region is contorted into a three-dimensional twisted shape.

6. The flow sensor housing of claim 1, wherein the flow channel further defines a flow path between the flow sensing region and the outlet flow port that is also contorted in three-dimensions.

7. The flow sensor housing of claim 6, wherein the flow path between the inlet flow port and the flow sensing region and the flow path between the flow sensing region and the outlet flow port are contorted into a common three-dimensional shape.

8. The flow sensor housing of claim 1, wherein at least a portion of the flow channel between the inlet flow port and the flow sensing region comprises a contoured three-dimensional path.

9. The flow sensor housing of claim 8, further comprising walls of the flow sensor housing, wherein the contoured three-dimensional path is defined by the walls, and wherein at least some of the walls are curved to help reduce turbulence in the fluid entering the flow sensing region.

10. The flow sensor housing of claim 1, wherein at least a portion of the flow channel upstream of the flow sensing region comprises a fin, wherein the fin is configured to laminarize the flow of the fluid in the flow sensing region.

11. A method of sensing flow rate of a fluid that has one or more particles in the fluid, the method comprising:
   directing the fluid between an inlet flow port of a housing and a flow sensing region of the housing, wherein the fluid is directed along a flow path that is contorted in three-dimensions between the inlet flow port and the flow sensing region, wherein the flow path comprises a particle collection region, wherein the flow path receives the fluid from the inlet flow port along a first axis and directs the fluid into the particle collection region through a first opening aligned perpendicular to a second axis;
   decelerating the fluid along the flow path that is contorted in three-dimensions in the particle collection region,
   releasing at least a portion of the one or more particles in the fluid in response to decelerating the fluid;
   collecting at least the portion of the one or more particles that are released in the particle collection region;

directing the fluid from the particle collection region to the flow sensing region through an opening aligned perpendicular to a third axis, wherein the first axis and the second axis are parallel to an X-axis and a Y-axis of an X-Y-Z coordinate system, and wherein the third axis has a component that is parallel to the Z-axis of the X-Y-Z coordinate system; and sensing the flow rate of the fluid in the flow sensing region.

12. The method of claim 11, wherein at least part of the flow path between the inlet flow port and a flow sensing region is contorted into a three-dimensional spiral shape.

13. The method of claim 11, wherein at least part of the flow path between the inlet flow port and a flow sensing region is contorted into a three-dimensional corkscrew shape.

14. The method of claim 11, wherein at least part of the flow path between the inlet flow port and a flow sensing region is contorted into a three-dimensional twisted shape.

15. The method of claim 11, further comprising:
directing the fluid from the flow sensing region to a second particle collection region;
decelerating the fluid and collecting particles that are released in the second particle collection region; and
directing the fluid from the second particle collection region to an outlet flow port.

16. The method of claim 11, wherein directing the fluid from the particle collection region to the flow sensing region comprises passing the fluid from the particle collection region through the second opening, wherein the second opening has a cross-sectional area that is less than the cross-sectional area of at least a portion of the flow path in the particle collection region.

17. The method of claim 11, wherein at least a portion of the flow path between the inlet flow port and the flow sensing region comprises a contoured three-dimensional path.

18. The method of claim 17, wherein the contoured three-dimensional path is defined by walls of the housing.

19. The method of claim 18, further comprising:
reducing turbulence in the fluid using the contoured three-dimensional path as the fluid is directed from the particle collection region to the flow sensing region.

20. The method of claim 11, wherein the fluid path further comprises a fin disposed upstream of the flow sensing region, wherein the method further comprises:
laminarizing the flow of the fluid using the fin as the fluid is directed from the particle collection region to the flow sensing region.

* * * * *